United States Patent Office 3,472,412
Patented Oct. 14, 1969

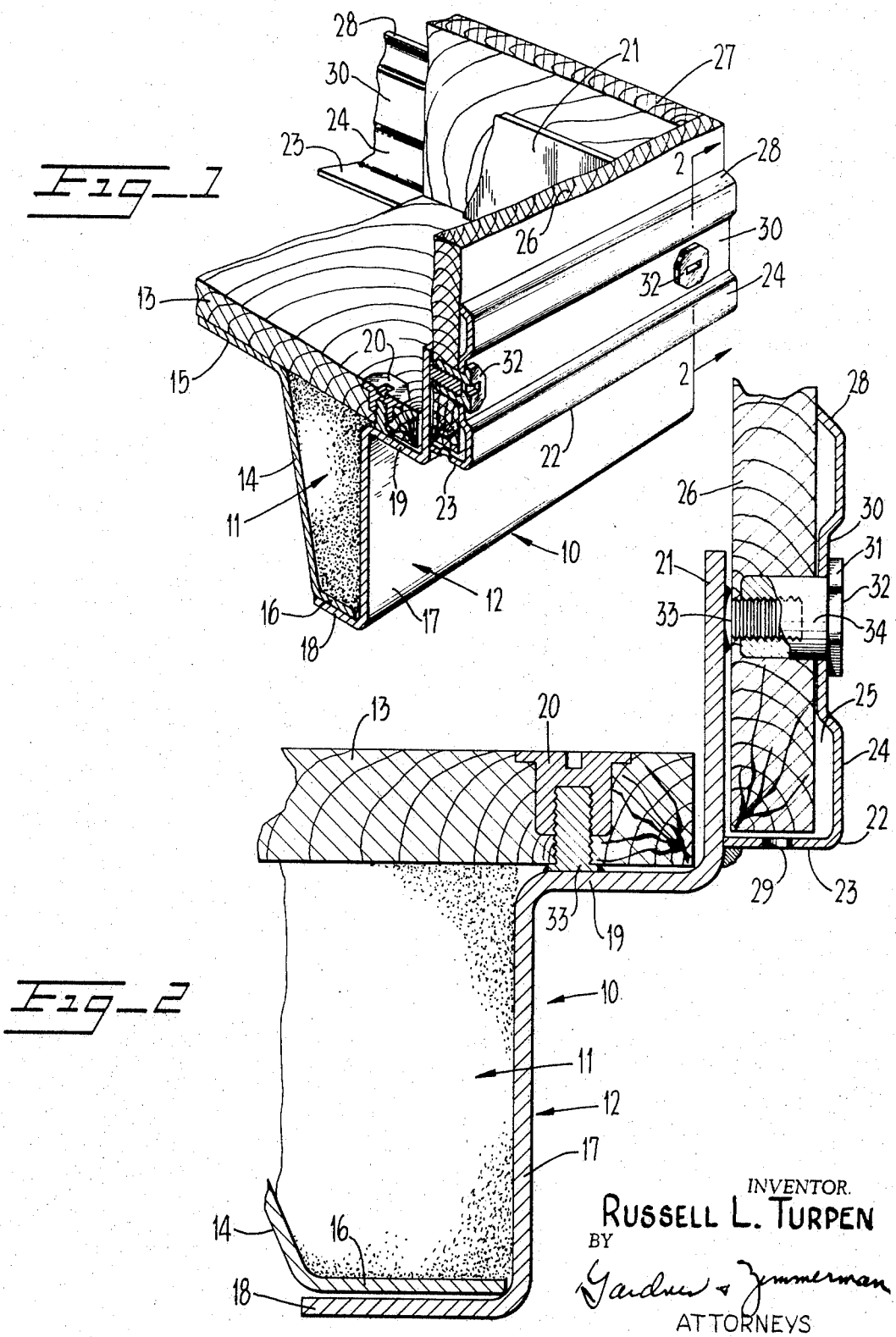

3,472,412
WALL SUPPORT CONSTRUCTION FOR CARGO CONTAINERS
Russell L. Turpen, Richmond, Calif., assignor, by mesne assignments, to Whittaker Corporation, Los Angeles, Calif.
Filed Oct. 5, 1967, Ser. No. 673,068
Int. Cl. B65d 9/34, 63/02
U.S. Cl. 217—69     8 Claims

ABSTRACT OF THE DISCLOSURE

A box-like container of large capacity for storing cargo and for transporting the same as by ship, rail, and truck. The cargo container includes upwardly extending side and end walls secured by connector structure to the floor of the container in a manner such that any upwardly and downwardly directed force components applied to a side or end wall of the container is transmitted through such connector structure to the container floor as a shearing force substantially devoid of bending moments. The connector structure by which this result is achieved includes along the marginal edge portions of the floor an upwardly opening perimetric channel into which the side and end walls of the container seat, and fasteners in the form of studs that extend through each such container wall and the wall segments of the associated channel bordering the same so that any such force components operative against a container wall are transmitted as a shearing force through such studs to the wall segments of the channel.

---

This invention relates to container structures of large capacity and, more particularly, to cargo containers such as those used to transport cargo by ship, rail and truck.

Cargo containers of the type being considered are quite large in a dimensional sense and are used to transport cargoes of various type by ship, rail and truck, and they may be transferred between such conveyences while filled with their lading. As a consequence of their size, large capacity and the great weight of the cargo carried thereby, such containers are often subjected to rather large forces which tend to stress the same and cause damage thereto whenever the stress becomes sufficiently large. A common damaging stress to which containers of this type are subjected occurs along the junction of the side and end walls of the container with the floor or base structure thereof, and while the origins of such stress may vary, in conventional containers it often appears wholly or in part as a torque or bending moment at such joindure tending to rip the wall from the base structure.

Since it is such bending moments that are especially destructive of cargo containers, an object, among others, of the present invention is to provide an improved cargo container in which the likelihood of the occurrence of such bending moments is significantly minimized with the result that damage to the container, or its lading, therefrom is significantly reduced. As concerns such improved cargo container, it includes along the base or floor structure thereof connector structure in the form of a perimetric frame defining along the marginal edges of the container an upwardly opening channel into which seat the side and end walls of the container. The channel-defining wall segments of the perimetric frame border the side and end walls along the lower edge portions thereof, and extending through the wall segments and container walls at spaced apart locations are a plurality of fasteners which are connected with each of the wall segments. As a result of this relationship, the frame wall segments themselves tend to receive directly and resist any force components applied laterally to the container side walls in transverse orientation to the planes thereof, wherefore substantially no bending moments derived from such components are operative upon the fastener structures, and similarly any upwardly and downwardly directed force components applied to the container walls along the planes thereof are transmitted through the fastener structures to the marginal walls of the frame as a shearing force rather than as a bending moment.

Additional objects and advantages of the invention will become apparent as the discussion thereof proceeds to a consideration of the specific structural embodiment of the invention illustrated in the accompanying drawing, in which:

FIGURE 1 is a broken perspective view of a corner portion of a cargo container embodying the invention; and FIGURE 2 is an enlarged, broken vertical sectional view taken along the line 2—2 of FIGURE 1.

Except as concerns the connector structure by means of which the upwardly extending side and end walls of the container are secured to the base thereof, the cargo container illustrated in the drawing may be conventional or, for example, may be of the type disclosed in the copending patent application of Russell L. Turpin, Ser. No. 559,316, filed June 21, 1966. Accordingly, the cargo container shown includes a base 10 comprising a floor structure 11 and a frame 12 associated therewith. In the usual case, the floor structure 11 includes flooring or a floor panel 13 ordinarily formed of wood, and such flooring is supported at appropriate locations therealong by an adequate number of joists or similar structural components. As a specific example, such support may be provided by a corrugated component 14 having a plurality of alternate ridges 15 and grooves 16, and which ridges actually receive and support the flooring 13 thereon, all as explained in such copending application, Ser. No. 559,316, now Patent No. 3,416,465.

The frame 12 is perimetric member that closes the floor structure 11, and in this respect it comprises an upwardly extending section 17 turned inwardly along its lower edge, as shown at 18, to form a skid underlying the corrugated support component 14. Adjacent its upper end, the frame section 17 is turned outwardly to form a horizontally oriented section 19 upon which the edge of the flooring 13 seats and to which it is attached by a plurality of fasteners 20 which may be conventional, and a conventional fastener often used for this purpose is known in the art as a Nelson stud. Along the outer edge of the horizontal section 19, the frame 12 is turned upwardly and forms an inner wall segment 21. Thus, the wall segment 21 is substantially parallel to the frame section 17 and, correspondingly, the sections 18 and 19 of the frame are substantially parallel. As shown in FIGURE 2, the frame sections 17, 18, 19 and 21 may be integral, and they are formed of steel or other material of comparable strength.

Secured to the wall segment 21 of the frame 12 and forming a part thereof is a generally L-shaped clamp 22, one leg 23 of which is horizontally disposed and is rigidly related to the wall section 21 as by means of the welding shown. The other leg of the clamp 22 extends upwardly and defines an outer wall segment 24 which is spaced outwardly from the wall segment 21 and is substantially parallel thereto. The wall segments 21 and 24 define therebetween an upwardly opening channel 25 which is closed along its bottom by the clamp leg 23 and seats therewithin the upwardly extending container walls, which, for purposes of differentiation, are identifiable as side walls 26 and end walls 27. Such upwardly extending container wall are usually formed of wood although other materials can be used.

It will be noted that the outer wall segment 24 is turned inwardly along the upper edge thereof, as shown at 28, so as to tightly engage the outer surface of the adjacent container wall and thereby minimize the passage of moisture therebetween into the channel 25. In this same reference, a plurality of weep holes or apertures 29 are provided in the leg 23 of the clamp 22 to facilitate drainage of moisture from the channel 25 which may enter the same. The outer wall segment 24 is also provided intermediate the upper and lower edges thereof with a longitudinally extending, inwardly deformed recess 30 adapted to seat therein the nuts 31 of a plurality of spaced apart fastener structures 32, each of which also includes a stud 33. Each of the fastener structures 32 may be a conventional Nelson stud which, as heretofore indicated, is a fastener that is well known in the art.

The stud 33 of each fastener 32 is welded or otherwise rigidly secured to the inner wall segment 21 so as to project outwardly therefrom and into the channel 25. Each such stud extends through an opening provided therefor in the adjacent container wall (a side wall 26 or end wall 27 as the case may be) and is threaded so as to matingly engage the associated nut 31. In this respect, each such nut extends through an opening in the outer wall segment 24 dimensioned to snugly receive the same and inwardly therefrom through an opening in the adjacent container wall. It will be apparent that as each nut 31 is turned onto the stud 33 therefor, it will be tightened against the wall segment 24 along the recess 30 thereof. Evidently, then, all of the fasteners 32 together with the wall segments 21 and 24 lock the container walls within the channel 25.

It is advantageous to provide a relatively close fit between each nut 31 and the opening therefor in the outer wall segment 24, and also between the nut and the opening in the container wall, so that relative displacements between the nut, wall segment 24 and associated container wall are minimized (it may be observed that the nut snugly engages the stud 33 and that the stud is rigidly related to the wall segment 21). It will be appreciated that each nut 31 has a cylindrical barrel 24 that projects through such opening therefor in the wall segment 24 and associated container wall so as to enable the nut to be rotated, and the head of the nut is evidently enlarged (as illustrated) so as to overlie surface portions of the outer wall segment 24 and firmly engage the same when the nut is tightened.

In considering the assembly of the cargo container, it will be recalled that the containers are large structures of substantial weight and, for the most part, are individually fabricated by manual processing techniques. Thus, in assembly, the upwardly extending side and end walls 26 and 27 of the container may be placed in position upon the studs 33 and then connected by the nuts 31 to the outer wall segment 24 of the clamp 22 before the leg 23 thereof is welded to the wall segment 21 of the frame 12. However, any other suitable assembly sequence and technique may be followed. In any event, after the upwardly extending container walls are properly related to the base 10, as shown in FGURES 1 and 2, any application of transverse force or force components to the container walls along the planes thereof will be resisted by the peremetric frame and especially the inner and outer wall segments 21 and 24 thereof.

More particularly, and referring to FIGURES 2, if a transversely oriented force is applied to the container wall 26 adjacent the upper end thereof in a direction tending to rotate such wall in a clockwise direction about a longitudinal axis generally established by the fasteners 32 and extending therethrough, the rotational displacement tending to be enforced upon the container wall 26 will be opposed by the outer wall segment 24 especially throughout the upper portion thereof and by the inner wall segment 21 especially along its lower portion and will appear in part as a tensile force along the associated fasteners 32. In an analogous manner, a transverse force applied to the wall 26 tending to rotate the same in a counter-clockwise direction about such axis will be resisted by the wall segments 21 and 24 and will result in the development of a tensile force along the fasteners 32. Further, and in either event, any bending moment tending to be enforced upon the fasteners 32 will be opposed by the connections thereof with the two wall segments 21 and 24.

Correspondingly, any stress in the form of either an upwardly or a downwardly directed force applied generally in the plane of the wall 26 (or wall 27) will be transmitted to the wall segments 21 and 24 via the fasteners 32, and in a particular sense will be transmitted by the fasteners at the points of their connection with the wall segments. Thus, such stress and the resistive force developed between the wall segments and fasteners in opposition thereto essentially constitute a shearing force since they appear at transversely spaced locations respectively defined by the points of connection of each fastener structure with the inner wall segment 21 and with the outer wall segment 24, wherefore no significant bending moment is imparted to the fasteners. Accordingly, the deleterious bending moments that tend to tear each fastener structure from its single point of connection to a wall segment in prior art cargo containers do not appear on the fastener structures in the cargo containers of the present invention.

What is claimed is:

1. A cargo container comprising a flooring, a plurality of upwardly oriented container walls respectively providing end and side walls of said container, and a frame member adjacent the lower end of said container connecting said container walls to said flooring, said frame member having spaced apart wall segments defining an upwardly opening channel in which said container walls are seated, and a plurality of individual fasteners extending between said wall segments and through said container walls for securing said container walls to said frame member, each of said fasteners being connected with each of said wall segments so that both upwardly directed and downwardly directed forces applied to said container wall generally along the plane thereof appear across said fastener essentially as a shearing force and impart substantially no bending moment thereto, each fastener comprising a stud secured to one wall segment and a nut extending through the other and threadedly engaging said stud, said frame member including a wall section extending between said wall segments and closing said channel along the bottom thereof, and said frame member being provided with a wall portion integral with the innermost of said wall segments, said portion including a generally horizontal section extending inwardly from the innermost of said wall segments and a section extending downwardly from said horizontal section, said flooring overlying said horizontal inwardly extending wall section inwardly of said wall segments.

2. The cargo container of claim 1 in which said outermost wall segment is provided with a recess adjacent each of said fasteners, and in which the nut of each fastener seats within said recess.

3. The cargo container of claim 2 in which said wall section is provided therealong with a plurality of drainage apertures for said channel.

4. The cargo container of claim 1 wherein said flooring is secured to said horizontal wall portion inwardly of said wall segments by a plurality of fastener structure extending through said flooring and secured to said horizontal wall portion.

5. A cargo container comprising a flooring an upwardly oriented container wall, a frame member adjacent the lower end of said container connecting said container wall to said flooring, said frame member having spaced apart wall segments defining an upwardly opening channel in which said container wall is seated and including a wall section extending between said wall segments closing said channel along the bottom thereof, and a plurality of individual fasteners spaced apart along said channel and extending between said wall segments through said container wall for securing said container wall thereto, each of said fasteners being connected with each of said wall segments so that both upwardly directed and downwardly directed forces applied to said container wall generally along the plane thereof appear across said fastener essentially as a shearing force and impart substantially no bending moment thereto, the upper edge of the outermost one of said wall segments being turned inwardly into tight engagement with the outer surface of the adjacent container wall to minimize the passage of moisture therebetween into said channel—and said frame member being provided with a wall portion integral with the innermost of said wall segments, said portion including a generally horizontal section extending inwardly from the innermost of said wall segments and a section extending downwardly from said horizontal section, said flooring overlying said horizontal inwardly extending wall section inwardly of said wall segments.

6. The cargo container of claim 5 in which said wall section is provided therealong with a plurality of drainage apertures for said channel.

7. The cargo container of claim 5 in which each of said fasteners comprises a stud secured to one wall segment and a nut extending through the other and threadedly engaging said stud.

8. The cargo container of claim 5 in which said outermost wall segment is provided with a recess adjacent each of said fasteners, and in which the nut of each fastener seats within said recess.

References Cited

UNITED STATES PATENTS

| | | | |
|---|---|---|---|
| 2,638,239 | 5/1953 | Cella | 217—69 |
| 2,724,468 | 11/1959 | Mautner | 217—69 XR |
| 2,850,204 | 9/1958 | Rehrig | 217—69 XR |

FOREIGN PATENTS 1,302,068  7/1962  France.

RAPHAEL H. SCHWARTZ, Primary Examiner